(12) United States Patent
Wakasa et al.

(10) Patent No.: US 6,638,487 B2
(45) Date of Patent: Oct. 28, 2003

(54) METHOD FOR CONTROLLING NOX REMOVAL SYSTEM IN BOILER

(75) Inventors: Satoshi Wakasa, Matsuyama (JP);
Noboru Takubo, Matsuyama (JP);
Yukihiro Isshiki, Matsuyama (JP);
Kouichi Masuda, Matsuyama (JP);
Nobuyuki Ishizaki, Brantford (CA)

(73) Assignees: Miura Co., Ltd., Ehime-ken; Miura Institute of Research and Development Co., Ltd., Ehime-ken ( * ) Notice: Subject to any disclaimer, the term of this patent is extended or adjusted under 35 U.S.C. 154(b) by 168 days.

(21) Appl. No.: 09/800,741

(22) Filed: Mar. 8, 2001

(65) Prior Publication Data

US 2001/0026785 A1 Oct. 4, 2001

(30) Foreign Application Priority Data

Mar. 30, 2000 (JP) ........................................ 2000-092583
Dec. 18, 2000 (JP) ........................................ 2000-383029

(51) Int. Cl.$^7$ ............................................... C01B 21/20
(52) U.S. Cl. ......................................... 423/235; 431/12
(58) Field of Search .............................. 423/235, 239.1, 423/239.2; 431/12, 76, 89, 90

(56) References Cited

U.S. PATENT DOCUMENTS

| 4,403,941 | A | * | 9/1983 | Okiura et al. ................. 431/10 |
| 4,541,367 | A | * | 9/1985 | Lindberg ................. 123/25 M |
| 4,681,746 | A | * | 7/1987 | Michalak et al. ........ 423/239.1 |
| 5,233,934 | A | | 8/1993 | Krigmont et al. |
| 5,315,941 | A | | 5/1994 | Vetterick et al. |
| 5,543,123 | A | | 8/1996 | Hofmann et al. |
| 5,813,224 | A | * | 9/1998 | Rao et al. ..................... 60/274 |
| 5,820,838 | A | | 10/1998 | Tsuo et al. |
| 5,985,222 | A | | 11/1999 | Sudduth et al. |
| 6,488,076 | B1 | * | 12/2002 | Yasuda et al. ................. 165/4 |

* cited by examiner

*Primary Examiner*—Stanley S. Silverman
*Assistant Examiner*—Edward M. Johnson
(74) *Attorney, Agent, or Firm*—Birch, Stewart, Kolasch & Birch, LLP (57) ABSTRACT

A method for controlling a NOx removal system in which reductant supply is adjusted according to combustion level in a boiler (1) in which the combustion level is controlled in multiple stages. For a decrease of the combustion level, the reductant supply is kept lower than a level corresponding to a changeover-target combustion level for a period of a set time from the changeover of the combustion level. Thus, when the reductant supply is changed over in response to a changeover of combustion level, the reductant can be prevented from flowing outside as it is unreacted.

4 Claims, 5 Drawing Sheets

METHOD FOR CONTROLLING NOX REMOVAL SYSTEM IN BOILER

BACKGROUND OF THE INVENTION

The present invention relates to a method for controlling a NOx removal system in a boiler intended to reduce NOx.

In recent years, there has been a desire for further NOx reduction also in boilers. One of the measures therefor is a method that with a NOx removal system provided in the boiler, ammonia as a reductant is supplied to discharge gas by the NOx removal system, thereby reducing the NOx. In this NOx removal system, ammonia is generated by heating urea water with ammonia generating means having an electric heater, and the amount of ammonia generation is controlled by adjusting the amount of urea water supplied to the ammonia generating means. The amount of ammonia supplied to discharge gas is controlled according to the combustion level of the boiler. For example, in a boiler in which combustion level is controlled in multiple stages of high combustion, low combustion and standby, the ammonia supply in the NOx removal system is also controlled in multiple stages in correspondence to the combustion levels.

In this connection, since piping of a specified length is provided to connect the ammonia generating means and jet nozzles for supplying ammonia to the discharge gas to each other, the ammonia supply cannot be changed over to a specified supply level unless the ammonia remaining in the piping is completely jetted out. This means that even if a changeover signal for combustion level and a changeover signal for ammonia supply are issued simultaneously, there will be a time lag until a changeover to a proper ammonia supply corresponding to the combustion level is actually effectuated. Therefore, in the case of a changeover of combustion level from high to low combustion level, it may occur that ammonia is supplied successively during the time lag so that part of the ammonia flows outside as it is, unfortunately.

In some cases, the NOx removal system is provided with a NOx removal catalyst for accelerating the reduction reaction of NOx by ammonia. In this NOx removal system, first the reductant is adsorbed by the NOx removal catalyst, and then NOx is decomposed into nitrogen and water promptly by a reduction reaction of NOx by the adsorbed reductant. Consequently, even with low-temperature discharge gas, NOx in the discharge gas can be reduced.

In this connection, in the NOx removal system provided with the NOx removal catalyst, there have been some cases where, at an increase of combustion level, for example, at a changeover of combustion level from low to high combustion level, unreacted part of ammonia flows outside as it is. In order to prevent such outflow of ammonia, it could be conceived to provide a large volume of the NOx removal catalyst, but this would incur upsizing of the NOx removal catalyst, inhibiting an efficient use of the NOx removal catalyst.

SUMMARY OF THE INVENTION

A first object of the present invention is to provide a method for controlling a NOx removal system in a boiler capable of preventing outflow of unreacted reductant from the boiler due to a delay from a changeover of combustion level of the boiler to a changeover of reductant supply.

A second object of the invention is to provide a method for controlling a NOx removal system in a boiler capable of preventing outflow of unreacted reductant from the boiler upon a changeover of combustion level of the boiler in the case where the NOx removal system is provided with a NOx removal catalyst.

In order to achieve the above second object, we inventors energetically made studies and experiments and so on with respect to the NOx removal system, having acquired the following finding. That is, the finding is that in order to prevent any leak of the reductant in increasing the combustion level, there is a need of adjusting the amount of reductant adsorption according to changes of the upper limit of reductant adsorption amount by the NOx removal catalyst (hereinafter, referred to as "saturation adsorption amount"). In more detail of this finding, since a reduction reaction of NOx in the NOx removal catalyst is caused by the reductant adsorbed by the NOx removal catalyst, a specified amount of reductant needs to have been adsorbed to achieve enough reduction of NOx. However, the reductant can only be adsorbed to the NOx removal catalyst up to the saturation adsorption amount. Also, the saturation adsorption amount decreases more and more with increasing temperature of the NOx removal catalyst, and increases more and more with decreasing temperature of the NOx removal catalyst. Therefore, when the temperature of discharge gas flowing through the NOx removal catalyst is increased due to an increase in combustion level, the NOx removal catalyst is heated by this discharge gas, causing the saturation adsorption amount to decrease. The result would be that the reductant is not adsorbed to the NOx removal catalyst or that adsorbed reductant is released out of the NOx removal catalyst, allowing unreacted reductant to be flowed out of the boiler. Accordingly, in order to prevent any leak of the reductant in increasing the combustion level, the reductant adsorption amount has to be decreased according to a reduction of the saturation adsorption amount. From this point of view, we inventors created a control method for solving the foregoing second object based on this finding.

The present invention having been achieved with a view to solving the foregoing issues, in a first aspect of the invention, there is provided a method for controlling a NOx removal system in which reductant supply is adjusted according to combustion level in a boiler in which the combustion level is controlled in multiple stages, the method comprising: for a decrease of the combustion level, keeping the reductant supply lower than a level corresponding to a changeover-target combustion level for a period of a set time from a changeover of the combustion level.

In a second aspect of the invention, there is provided a method for controlling a NOx removal system in which reductant supply is adjusted according to combustion level in a boiler in which the combustion level is controlled in multiple stages, the method comprising: for a decrease of the combustion level, changing over the reductant supply earlier than a changeover of the combustion level.

In a third aspect of the invention, there is provided a method for controlling a NOx removal system in which reductant supply is adjusted according to combustion level in a boiler in which the combustion level is controlled in multiple stages, where the reductant is reacted in a NOx removal catalyst, the method comprising: for an increase of the combustion level, keeping the reductant supply lower than a level corresponding to a changeover-target combustion level for a period of a set time from a changeover of the combustion level.

Further, in a fourth aspect of the invention, there is provided a method for controlling a NOx removal system in which reductant supply is adjusted according to combustion level in a boiler in which the combustion level is controlled in multiple stages, where the reductant is reacted in a NOx removal catalyst, the method comprising: for an increase of the combustion level, making and keeping the reductant supply at a lower level for a period of a set time lasting until a changeover of the combustion level.

Next, embodiments of the present invention are described. The invention is suitably embodied in a NOx removal system of a boiler. This boiler is, for example, a multi-tubular boiler, and the boiler body has a constitution in which, as an example, a combustion chamber is formed inside annular heat transfer tube arrays while an annular gas passage is formed outside the annular heat transfer tube arrays, where a flue is connected to the gas passage.

The NOx removal system is so constructed that the reductant is jetted out from jet nozzles provided at an outlet of the gas passage into combustion gas to thereby reduce the NOx in the combustion gas. In the case where the reductant is ammonia generated by heating and decomposing urea water, an ammonia generating means having a heating means such as electric heater is connected to the jet nozzles and the urea water supply to the ammonia generating means is controlled, by which the amount of ammonia jetted out from the jet nozzles is controlled. Other than urea water, compounds that are decomposed by heating to generate ammonia, such as cyanuric acid, melamine and biuret are also usable.

The boiler is so constructed that combustion level is controlled in multiple stages, e.g. three stages of high combustion, low combustion and standby, or four stages of high combustion, middle combustion, low combustion and standby. Therefore, in the NOx removal system, the reductant supply is controlled in multiple stages according to the combustion level of the boiler. That is, for three-stage control of combustion level, the reductant supply is controlled also in three stages, and for four-stage control of combustion level, the reductant supply is controlled also in four stages.

In the NOx removal system, the reductant supply for each level is set according to the NOx generation level corresponding to each combustion level of the boiler. For a changeover of combustion level, a changeover of the reductant supply is controlled as follows.

First, a first control method and a second control method are described. These control methods are those for solving the foregoing first issue. Firstly, in the first control method, for a decrease of combustion level, the reductant supply is kept smaller than a level corresponding to the changeover-target combustion level for a set time period starting at the changeover of combustion level. Then, after an elapse of the set time period, the reductant supply is changed over to the level corresponding to the changeover-target combustion level. By so doing, during the time lag from the issue of a reductant-supply-amount changeover signal to the actual changeover of the amount of the reductant jetted out from the jet nozzles, any excessive jet-out of reductant can be prevented so that the reductant can be prevented from flowing outside as it is unreacted. Otherwise, the supply of reductant may be halted for the set time period, where the reductant supply corresponding to the changeover-target combustion level is set to zero, depending on the circumstances of embodiment.

In the case where the first control method is executed, for an increase of combustion level, output of a combustion-level changeover signal and output of a reductant-supply-amount changeover signal are effected simultaneously. In this case, although the reductant supply becomes slightly short relative to the amount of NOx generation during the aforementioned time lag, yet this only lasts for a very short time without any problem.

Next, the second control method is described. In this second control method, for a decrease of combustion level, the reductant supply is changed over earlier than the combustion level is changed over. More specifically, a timing at which the amount of reductant jetted out from the jet nozzles is actually changed over is predicted by taking into consideration the time lag, and in order that the combustion level is changed over at this timing, output of the combustion-level changeover signal and output of the reductant-supply-amount changeover signal are effected with a specified time lag. By so doing, at a changeover of combustion level, any excessive jet-out of reductant can be prevented so that the reductant can be prevented from flowing outside as it is unreacted.

With regard to the specified time lag, since a changeover of combustion level in the boiler is performed normally based on steam pressure, the time at which the steam pressure will reach a set value for the changeover of combustion level can be predicted by detecting the variation gradient of steam pressure. Accordingly, a reductant-supply-amount changeover signal is outputted somewhat earlier than the predicted time. Otherwise, depending on the circumstances of embodiment, the output of the combustion-level changeover signal may be delayed by a specified time by outputting the reductant-supply-amount changeover signal when the steam pressure reaches the set value, and by outputting the combustion-level changeover signal in a specified time elapse after the steam pressure has reached the set value.

The second control method, although intended for use at a decrease of combustion level, may also be applied when the boiler is stopped from combustion and brought into a standby state. In this case, for a halt of the combustion of the boiler, a reductant-supply halt signal is outputted a specified time earlier than a combustion halt signal.

In the case where the second control method is executed, for an increase of combustion level, output of a combustion-level changeover signal and output of a reductant-supply-amount changeover signal are effected simultaneously. In this case, although the reductant supply becomes slightly short relative to the amount of NOx generation during the aforementioned time lag, yet this only lasts for a very short time without any problem.

Furthermore, the first control method and the second control method, usable each singly as they are, may also be used together in combination. The first control method and the second control method may be executed in this order for a changeover of combustion level. That is, for a decrease of combustion level, the reductant supply may be made smaller than a level corresponding to the changeover-target combustion level earlier than this changeover of combustion level, and maintained for a set time period from the changeover of combustion level.

As described above, according to the first control method and the second control method, for a decrease of combustion level, any excessive jet-out of reductant can be prevented so that the reductant can securely be prevented from flowing outside as it is unreacted.

Next, a third control method and a fourth control method of the invention are described. These control methods are those for solving the foregoing second issue and for cases in which the NOx removal system is provided with a NOx removal catalyst. The NOx removal catalyst has a function of accelerating the reduction reaction of NOx by a reductant, and is placed within the flue. Accordingly, when combustion gas mixed the reductant at the outlet of the gas passage has flowed as discharge gas along up to the NOx removal catalyst, the NOx reduction reaction by the NOx removal catalyst is accelerated by the NOx removal catalyst so that NOx is decomposed into nitrogen and water promptly, with the result of reduced NOx.

With further regard to the NOx removal catalyst, in order that the NOx reduction reaction is accelerated by the NOx removal catalyst, a specified amount of reductant needs to have been adsorbed in the NOx removal catalyst. In this connection, there is an upper limit for the amount of reductant adsorbed into the NOx removal catalyst, where this upper limit of adsorption (hereinafter, referred to as "saturation adsorption amount") decreases with increasing temperature of the NOx removal catalyst and, conversely, increases with decreasing temperature of the NOx removal catalyst. Therefore, as the discharge gas passing through the NOx removal catalyst increases in temperature due to an increase in the combustion level of the boiler, the NOx removal catalyst is heated by the discharge gas, causing the saturation adsorption amount to decrease. However, the NOx removal catalyst is accelerated in its reduction reaction in proportion to increase of its temperature, thus capable of enough reduction of NOx even if the saturation adsorption amount has decreased.

Now the third control method is described. In the third control method, for an increase of combustion level, the reductant supply is kept smaller than a level corresponding to the changeover-target combustion level for a set time period starting at the changeover of combustion level. Then, after the changeover of combustion level, the reductant supply becomes slightly short relative to the amount of NOx generation, and this shortage is compensated by the reductant that has been adsorbed to the NOx removal catalyst, causing the reductant adsorption amount to decrease. After an elapse of the set time period, the reductant supply is changed over to the level corresponding to the changeover-target combustion level. The set time period is a value determined according to the time necessary for the NOx removal catalyst to decrease to the level corresponding to the decrease in the saturation adsorption amount after the changeover-target combustion level.

Thus, the adsorption amount can also be decreased according to the decrease in the saturation adsorption amount caused by the increase in the combustion level. Accordingly, when the combustion level is increased, the reductant can be prevented from flowing out of the boiler due to the reasons that the reductant is not adsorbed to the NOx removal catalyst or that the reductant that has been adsorbed to the NOx removal catalyst is released out.

Next, the fourth control method is described. In this fourth control method, for an increase of combustion level, the reductant supply is kept smaller for a set time period lasting to the changeover of combustion level. Then, when or after the combustion level is changed over, the reductant supply is changed over to the level corresponding to the changeover-target combustion level.

By so doing, before a changeover of combustion level, the reductant adsorption amount in the NOx removal catalyst can be decreased in advance. Therefore, even if the saturation adsorption amount has decreased due to an increase in combustion level, the reductant is adsorbed by the NOx removal catalyst so that the reductant that has been adsorbed to the NOx removal catalyst is no longer released out. Thus, the reductant can be prevented from flowing out of the boiler.

The third control method and the fourth control method, usable each singly as they are, may also be used together in combination. The third control method and the fourth control method may be executed in this order for a changeover of combustion level. That is, for an increase of combustion level, the reductant supply may be made smaller than a level corresponding to the changeover-target combustion level earlier than this changeover of combustion level, and maintained for a set time period from the changeover of combustion level.

Furthermore, in the NOx removal system provided with the NOx removal catalyst, for an increase of combustion level of the boiler, either one of the third control method or the fourth control method or both of them in combination are used for control, whereas for a decrease of the combustion level, either one of the first control method or the second control method or both of them in combination may be used for control.

In the above description, the reductant supply is decreased at a changeover of the combustion level. This decrease of supply amount includes a case where the reductant supply is set to zero.

DETAILED DESCRIPTION OF THE PREFERRED EMBODIMENTS

Hereinbelow, concrete examples of the present invention are described in detail with reference to the accompanying drawings. First, the NOx removal system of a boiler which embodies the invention is explained with reference to FIG. 1. This boiler adopts a so-called three-position control type combustion control in which the combustion level is controlled in three stages of high combustion, low combustion and standby.

Figure 1:
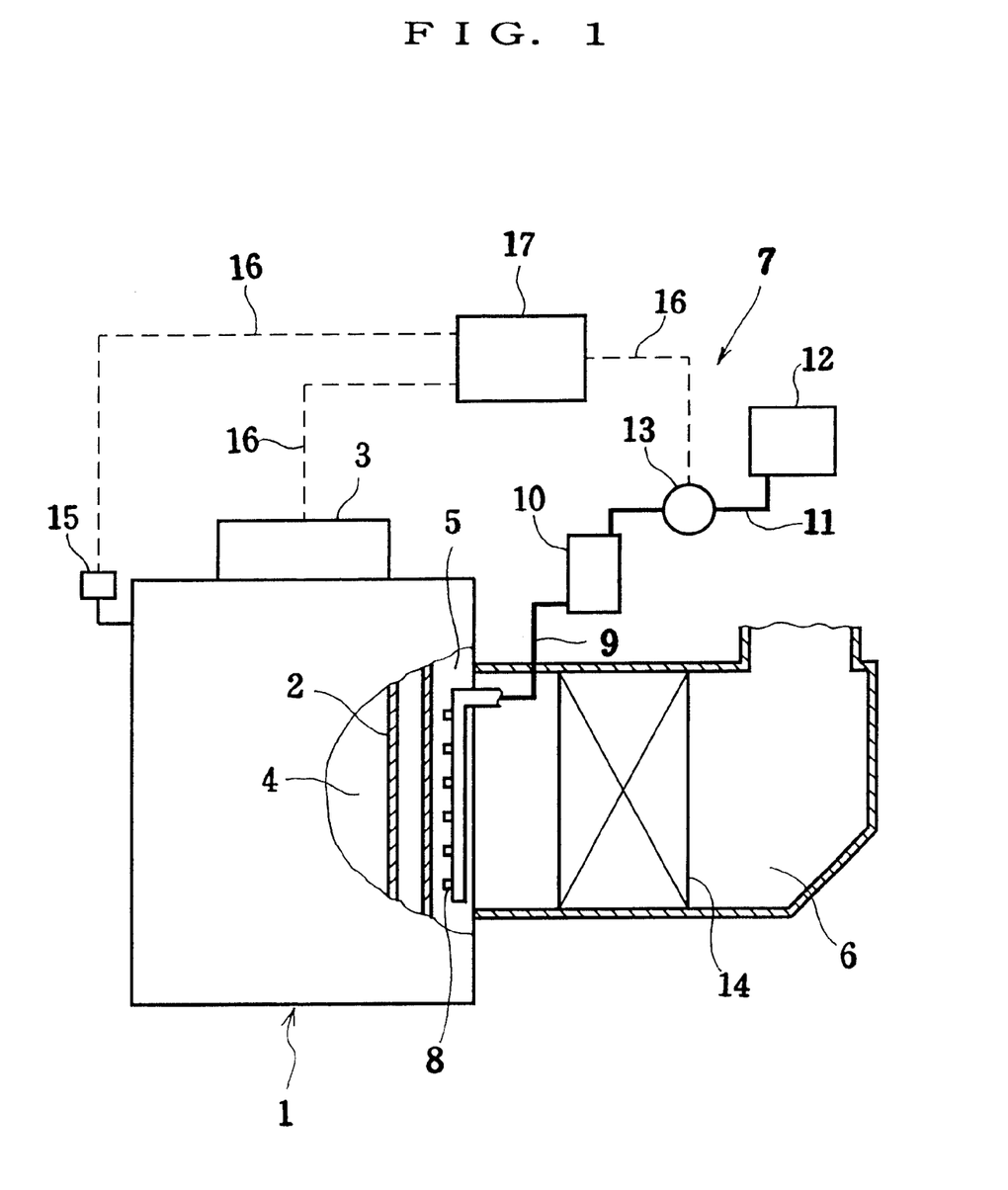
FIG. 1 is an explanatory view showing an example of the NOx removal system in a boiler embodying the invention.

In FIG. 1, a boiler 1 has an upper header (not shown) and a lower header (not shown). A plurality of heat transfer tubes 2, 2, . . . are placed between these two headers. These heat transfer tubes 2 are arranged into an annular shape between the two headers, constituting an annular heat transfer tube array (indicated by no numeral), and upper end and lower end of each heat transfer tube 2 are connected to the upper header and the lower header, respectively. Further, a burner 3 is attached on top of the boiler 1, and a combustion chamber 4 is defined inside the annular heat transfer tube arrays. An annular gas passage 5 is provided outside the annular heat transfer tube arrays. Further, a flue 6 is connected to a side wall of the boiler 1 in communication with the gas passage 5.

In this boiler 1, a NOx removal system 7 is so constructed as to feed ammonia as a reductant to the outlet of the gas passage 5. That is, the NOx removal system 7 has a plurality of ammonia jet nozzles 8, 8, . . . provided at the outlet portion of the gas passage 5. In the case of FIG. 1, the jet nozzles 8 are set, six in number, along the axes of the heat transfer tubes 2 so that ammonia is jetted out toward the upstream side of the gas passage 5. That is, the jet nozzles 8 are so positioned that ammonia is jetted out in a direction opposite to the flow of combustion gas in the gas passage 5.

An ammonia generating means 10 is connected to the jet nozzles 8 via an ammonia feed pipe 9. This ammonia generating means 10 is a means which decomposes urea water by heating to generate ammonia, and a urea water tank 12 is connected to this ammonia generating means 10 via a urea water feed pipe 11. The ammonia generating means 10 is also provided with an electric heater (not shown) for heating urea water, and a urea water feed pump 13 is provided on the urea water feed pipe 11. Accordingly, urea water is fed from the urea water tank 12 to the ammonia generating means 10 by operating the urea water feed pump 13, the urea water is heated at the ammonia generating means 10 to generate gaseous ammonia continuously, and this ammonia is fed to the jet nozzles 8, where the ammonia is jetted out from the jet nozzles 8. In this case, the control of the ammonia supply with respect to combustion gas is performed by controlling the supply amount of urea water by the urea water feed pump 13.

Further, the NOx removal system 7 is provided with a NOx removal catalyst 14 for accelerating the reaction of NOx and ammonia, and the NOx removal catalyst 14 is set within the flue 6. In more detail of the action of the NOx removal catalyst 14, the NOx removal catalyst 14 first adsorbs ammonia, and decomposes NOx into nitrogen and water by reduction reaction of the adsorbed ammonia and NOx. Therefore, a specified amount of ammonia needs to have been adsorbed in the NOx removal catalyst 14. However, there is an upper limit on the ammonia adsorption amount in the NOx removal catalyst, where this upper limit of adsorption amount (hereinafter, referred to as "saturation adsorption amount") decreases with increasing temperature of the NOx removal catalyst 14 and, conversely, increases with decreasing temperature of the NOx removal catalyst 14.

Next, control structure of the boiler 1 and the NOx removal system 7 is described. First, a pressure sensor 15 is provided in the boiler 1 so that steam pressure within the boiler 1 is detected by this pressure sensor 15. The pressure sensor 15 and the burner 3 are connected to a controller 17 via signal lines 16, 16 so that the combustion level of the burner 3 is controlled in multiple stages according to a signal from the pressure sensor 15. The boiler 1 is controlled in combustion level in three stages of high combustion, low combustion and standby, where the high combustion is moved to the low combustion when the steam pressure has increased beyond a preset first pressure, and the low combustion is moved to the standby when the steam pressure has further increased beyond a preset second pressure. Also, the standby is moved to the low combustion when the steam pressure has decreased under the second pressure, and the low combustion is moved to the high combustion when the steam pressure has further decreased under the first pressure.

In the NOx removal system 7, the urea water feed pump 13 is connected to the controller 17 via the signal line 16. Accordingly, the urea water feed pump 13 is controlled by the controller 17 so that the urea water supply, i.e. the ammonia supply, is controlled according to the combustion level. In this case, the ammonia supply has been set according to the amounts of NOx generation at individual combustion levels.

With the constitution as described above, when the burner 3 is operated, gas under a combustion reaction, i.e. combustion gas in a flame state, arises in the combustion chamber 4. This flame-state combustion gas, after generally completing its combustion reaction in the combustion chamber 4, flows into the gas passage 5. After flowing through the gas passage 5, the combustion gas is discharged outside through the flue 6 as discharge gas.

With the burner 3 keeping in operation, when the urea water feed pump 13 and the ammonia generating means 10 are operated, ammonia generated from the urea water is jetted out from the jet nozzles 8 via the ammonia feed pipe 9. The ammonia jetted out from the jet nozzles 8 is mixed with combustion gas at the outlet portion of the gas passage 5. At this time point, ammonia is jetted out in a direction opposite to the flow direction of the combustion gas, which accelerates the mixing of ammonia and combustion gas. Then, while the combustion gas mixed with ammonia passes through the NOx removal catalyst 14, the reduction reaction of NOx by ammonia is accelerated by the NOx removal catalyst 14 so that the NOx is promptly decomposed into nitrogen and water. Thus, NOx in the combustion gas is reduced.

In this connection, a changeover of ammonia supply in correspondence to a changeover of combustion level of the burner 3 is controlled as follows.

Figure 2:
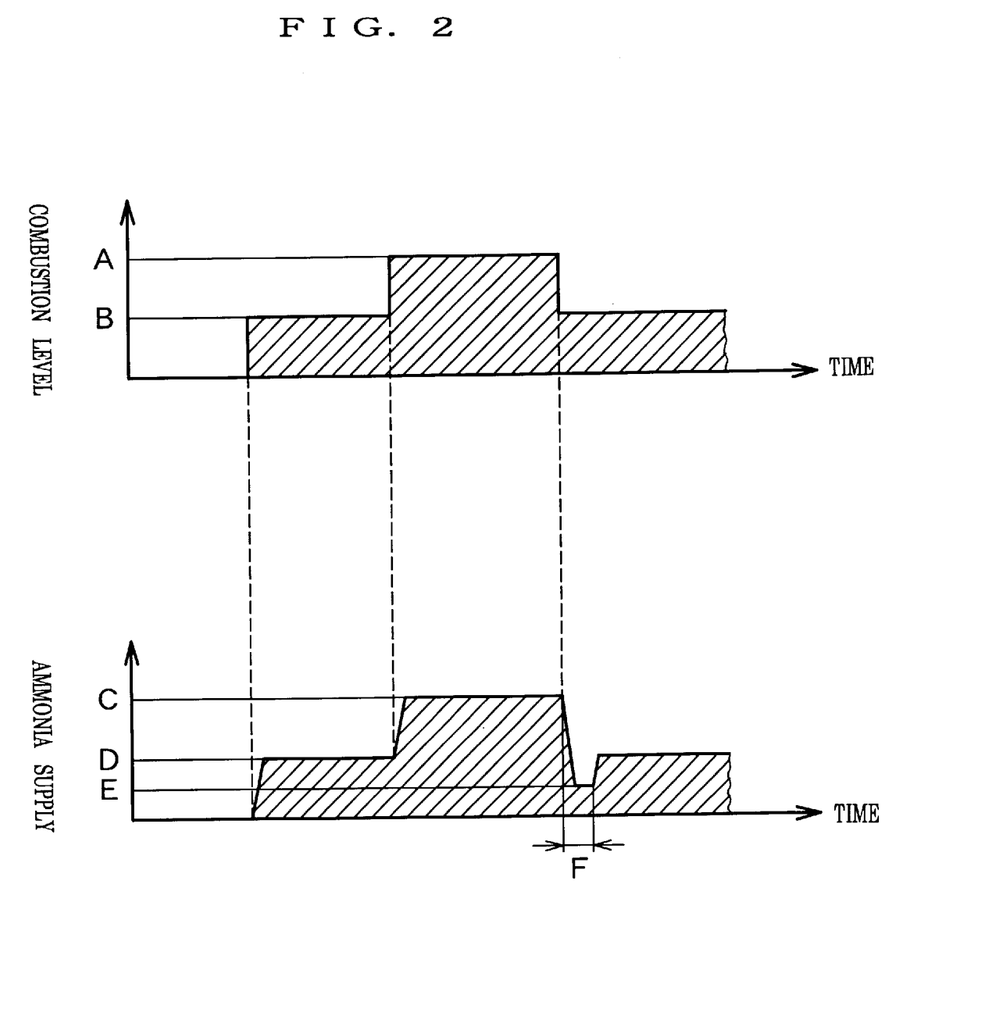
FIG. 2 is an explanatory view showing a first control method of the invention.

First, the first control method is explained with reference to FIG. 2. In this case, the combustion level of the boiler 1 and the ammonia supply of the NOx removal system 7 are set as shown in FIG. 2. Firstly, the combustion level for high combustion is set to a first combustion level A, the combustion level for low combustion is set to a second combustion level B, and the combustion level for standby is set to zero. Then, the ammonia supply for high combustion corresponding to the first combustion level A is set a first supply C, the ammonia supply for low combustion corresponding to the second combustion level B is set to a second supply D, and the ammonia supply for standby is set to zero.

Accordingly, at a move from standby to low combustion, the combustion level is changed over from zero to the second combustion level B, while the ammonia supply is changed over from zero to the second supply D. In this case, the changeover signal for combustion level and the changeover signal for ammonia supply are outputted simultaneously. Also, at a move from low combustion to high combustion, the combustion level is changed over from the second combustion level B to the first combustion level A, while the ammonia supply is changed over from the second supply D to the first supply C. In this case also, the changeover signal for combustion level and the changeover signal for ammonia supply are outputted simultaneously. In this connection, in a comparison to the changeover of combustion level, there is a time lag from an output of a changeover signal for ammonia supply to an actual changeover of ammonia supply. During this time lag, indeed the reductant supply becomes slightly short relative to the amount of NOx generation, but this only lasts for a very short time without any problem.

Further, at a move from high combustion to low combustion, the combustion level is changed over from the first combustion level A to the second combustion level B, while the ammonia supply is changed over from the first supply C to a third supply E and, after an elapse of a first set time F, further changed over to the second supply D. The third supply E is set to a value smaller than the second supply D, for example, about one half. That is, at a move from high combustion to low combustion, the ammonia supply is changed over and lessened to the third supply E, kept as it is, for a period of the first set time F, and then further changed over to the second supply D. By so doing, the ammonia supply is prevented from becoming excessive relative to the amount of NOx generation during the time lag, so that ammonia can be prevented from flowing outside as it is unreacted. It is noted here that the first set time F is set with consideration given to a time elapse that is necessary for the actual amount of ammonia jetted out from the jet nozzles 8 to balance with the amount of NOx generation at low combustion.

Figure 3:
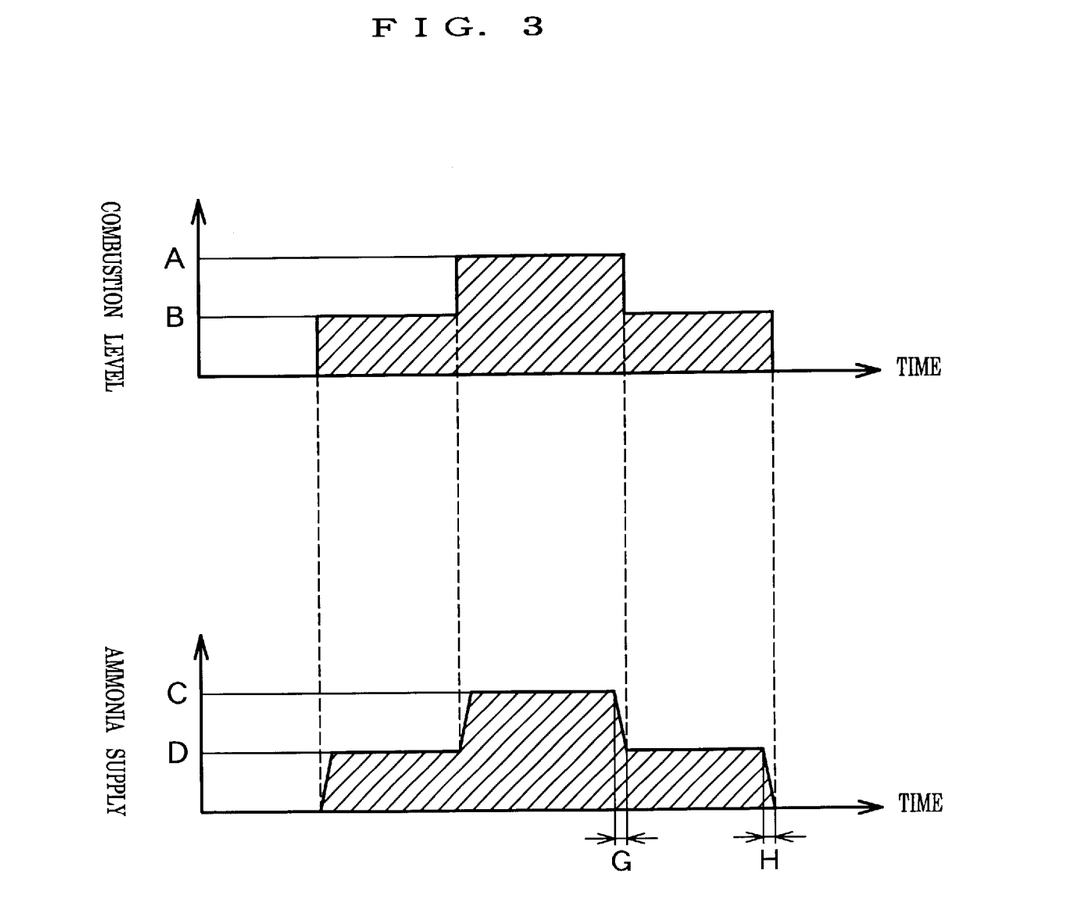
FIG. 3 is an explanatory view showing a second control method of the invention.

Next, the second control method is explained with reference to FIG. 3. In this second control method, the same control as in the first control method is performed for a move from low combustion to high combustion, and so the description therefor is omitted. Now in the second control method, at a move from high combustion to low combustion, a second set time G earlier than the combustion level is changed over from the first combustion level A to the second combustion level B, the ammonia supply is changed over from the first supply C to the second supply D. That is, with consideration given to the time lag, a time period necessary for the actual amount of ammonia jetted out from the jet nozzles 8 to decrease to a level corresponding to the amount of NOx generation at the low combustion is taken into account for the setting of the second set time G, and a changeover signal for ammonia supply is outputted earlier by the second set time G.

In this case, the timing of outputting the changeover signal for ammonia supply earlier by the second set time G is controlled as follows. A move from high combustion to low combustion is effected on condition that the steam pressure of the boiler 1 exceeds the first pressure. Therefore, by monitoring the variation gradient of steam pressure, and by predicting the time at which the steam pressure will reach the first pressure, a changeover signal for ammonia supply is outputted the second set time G earlier than the predicted time. As a result of this, at a move from high combustion to low combustion, ammonia supply can be prevented from becomes excessive relative to the amount of NOx generation so that ammonia can be prevented from flowing outside as it is unreacted.

Further, at a move from low combustion to standby, a third set time H earlier than the combustion level is changed over from the second combustion level B to zero, the ammonia supply is changed over from the second supply D to zero. That is, with consideration given to the time lag, a time period necessary for the actual amount of ammonia jetted out from the jet nozzles 8 to decrease to zero is taken into account for the setting of the third set time H, and a changeover signal for ammonia supply is outputted earlier by the third set time H.

In this case, the timing of outputting the changeover signal for ammonia supply earlier by the third set time H is controlled in the same manner as with the second set time G. That is, by monitoring the variation gradient of steam pressure, and by predicting the time at which the steam pressure will reach the second pressure, a changeover signal for ammonia supply is outputted the third set time H earlier than the predicted time. As a result of this, at a move from low combustion to standby, ammonia supply can be prevented from becomes excessive so that ammonia can be prevented from flowing outside as it is unreacted.

Although the first control method and the second control method are used each singly in the above description, yet both control methods may be used together in combination, which case is explained below. In this case, the first control method is used for a move from high combustion to low combustion, and the second control method is used for a move from low combustion to standby. More specifically, at a move from high combustion to low combustion, as shown in FIG. 2, the ammonia supply is first changed over to the third supply E, kept as it is for a period of the first set time F, and further changed over to the second supply D. Also, at a move from low combustion to standby, as shown in FIG. 3, the ammonia supply is changed over from the second supply D to zero earlier by the third set time H.

Next, the third control method and the fourth control method are described. It is assumed in the following description that a specified amount of ammonia necessary for enough reduction of NOx has been adsorbed to the NOx removal catalyst 14.

Figure 4:
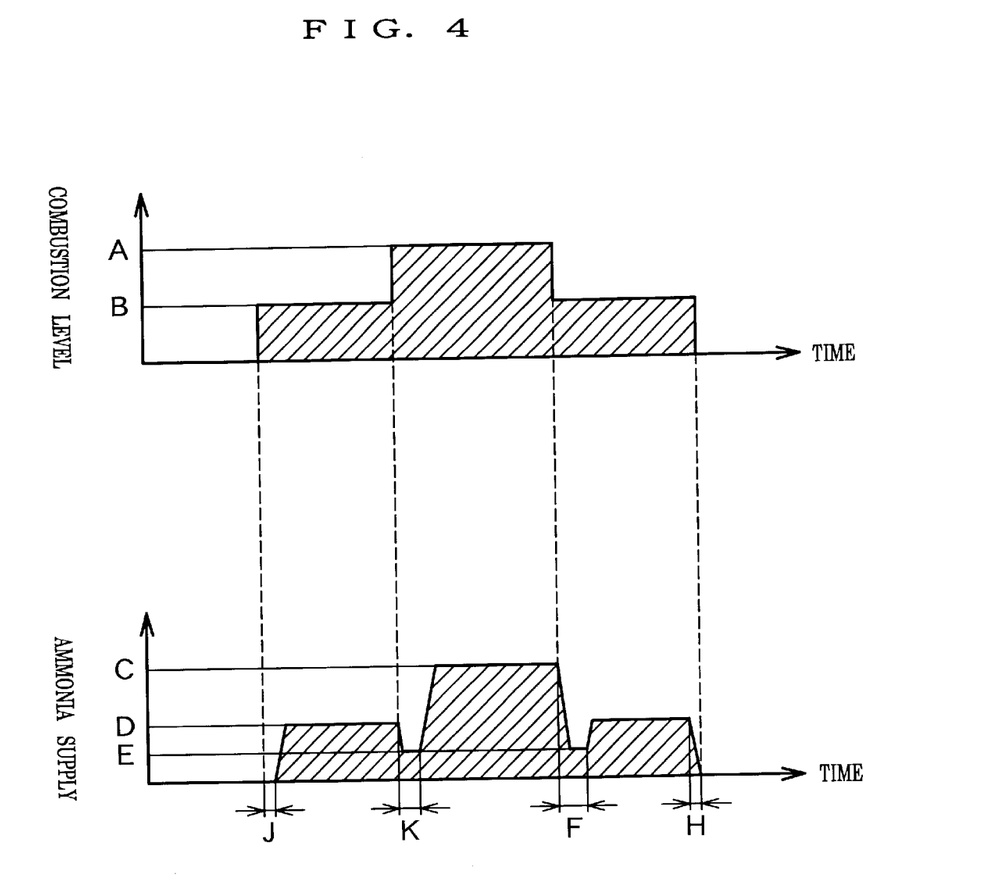
FIG. 4 is an explanatory view showing a third control method of the invention.

Referring first to the third control method, for a move from standby to low combustion, a changeover signal for combustion level is first outputted as shown in FIG. 4. Then, the combustion level is changed over from zero to the second combustion level B. Now combustion being started, as discharge gas begins to flow to the NOx removal catalyst 14, the NOx removal catalyst 14 increases in temperature, causing the saturation adsorption amount to decrease. Whereas the ammonia supply is zero at this time point, reduction reaction of NOx is performed by ammonia that has been adsorbed to the NOx removal catalyst 14. Therefore, the adsorption amount of ammonia in the NOx removal catalyst 14 decreases.

After a time elapse of a fourth set time J since the output of the changeover signal for combustion level, a changeover signal for ammonia supply is outputted. Then, combustion level is changed over to the second combustion level B, and thereafter the ammonia supply is changed over from zero to the second supply D. In this case, the fourth set time J is determined based on the ammonia supply and on a time lag from the start of combustion to the time at which the temperature of the NOx removal catalyst 14 reaches the temperature of discharge gas. That is, the fourth set time J is determined by taking into account the ammonia supply so that the adsorption amount of ammonia in the NOx removal catalyst 14 becomes a specified adsorption amount not more than the saturation adsorption amount before the temperature of the NOx removal catalyst 14 becomes the temperature of discharge gas.

Accordingly, in the case of a changeover of combustion level from zero to the second combustion level B, since the adsorption amount of ammonia in the NOx removal catalyst 14 decreases according to the decrease of the saturation adsorption amount as a result of setting the ammonia supply to zero, the ammonia can be prevented from flowing out of the boiler 1 due to the reasons that ammonia is not adsorbed to the NOx removal catalyst 14 or that the reductant that has been adsorbed to the NOx removal catalyst 14 is released out.

Next, at a move from low combustion to high combustion, a changeover signal for combustion level as well as a changeover signal for ammonia supply are outputted. As a result, the combustion level is changed over from the second combustion level B to the first combustion level A, while the ammonia supply is changed over from the second supply D to the third supply E. After a time elapse of a fifth set time K since the output of the changeover signal for combustion level, a changeover signal for ammonia supply is outputted. Then, the ammonia supply is changed over from the third supply E to the second supply D. In this case, the fifth set time K is determined, as in the case of the fourth set time J, based on a time lag until the time at which the temperature of the NOx removal catalyst 14 reaches the temperature of discharge gas when the combustion level is increased.

As described before, when the combustion level is increased from low combustion to high combustion, the discharge gas passing through the NOx removal catalyst 14 increases in temperature, so that the NOx removal catalyst 14 increases in temperature, with the saturation adsorption amount decreased. However, at a move from low combustion to high combustion, since the ammonia supply has been decreased, ammonia that has been adsorbed to the NOx removal catalyst 14 is used for the reduction reaction of NOx, causing the adsorption amount of reductant to decrease. Therefore, since the adsorption amount of ammonia in the NOx removal catalyst 14 decreases according to the decrease of the saturation adsorption amount, the ammonia can be prevented from flowing out of the boiler 1 due to the reasons that ammonia is not adsorbed to the NOx removal catalyst 14 or that the reductant that has been adsorbed to the NOx removal catalyst 14 is released out.

Now a modification of the third control method is described. FIG. 4 illustrates control contents including a modification of the third control method, and this modification is explained. In this modification of the third control method, for a decrease of combustion level, the first control method and the second control method are used together in combination. First, for a move from high combustion to low combustion, the same control as in the first control method, i.e. the control that the ammonia supply is changed over to the third supply E, and kept as it is, for a period of the first set time F, is performed and so detailed description of the control contents is omitted. Further, at a move from low combustion to standby, the same control as in the second control method, i.e. the control that the ammonia supply is changed over from the second supply D to zero the third set time H earlier than the changeover from the second combustion level B to zero, is performed and so detailed description of the control contents is omitted.

Figure 5:
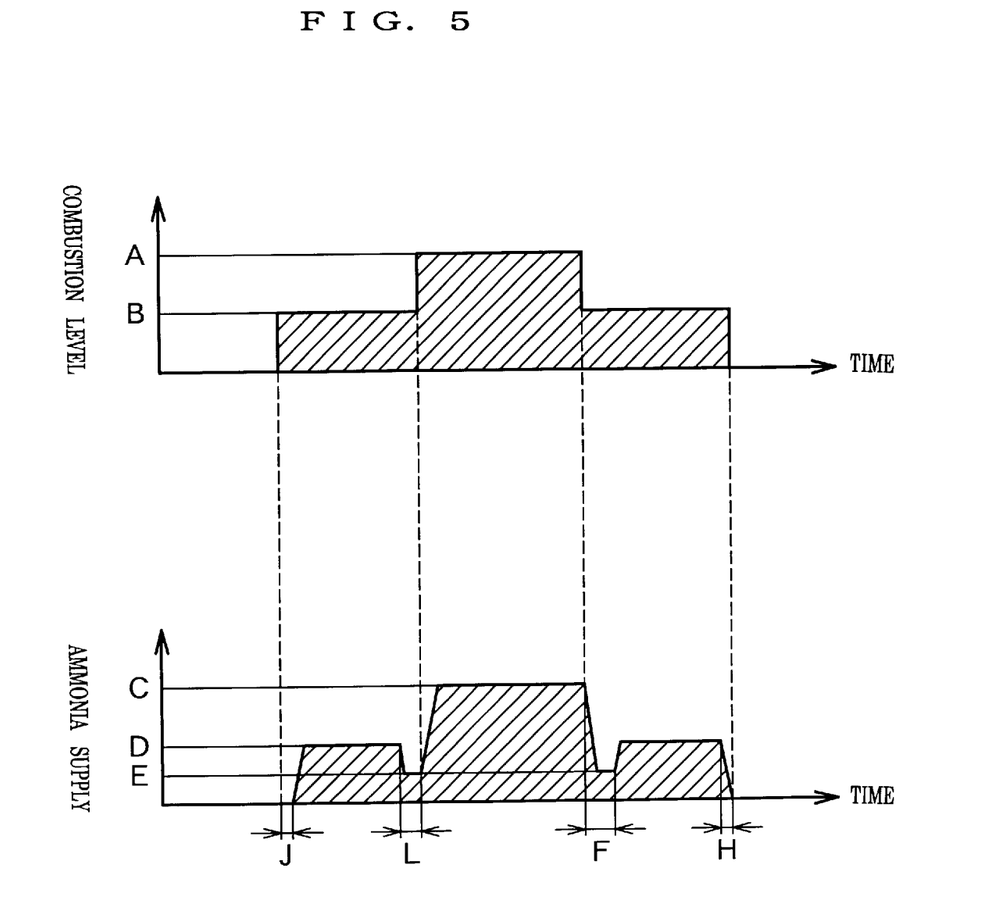
FIG. 5 is an explanatory view showing a fourth control method of the invention.

Next, the fourth control method is explained with reference to FIG. 5. In this fourth control method, at a move from low combustion to high combustion, the ammonia supply is changed over from the second supply D to the third supply E a sixth set time L earlier than the combustion level is changed over from the first combustion level A to the second combustion level B. Then, at a changeover of combustion level from the second combustion level B to the first combustion level A, the ammonia supply is changed over to the first supply C.

In this case, by decreasing the ammonia supply before the changeover of combustion level, the adsorption amount of ammonia in the NOx removal catalyst 14 is decreased. As a result, even if the saturation adsorption amount has decreased due to the increase of combustion level, the ammonia is prevented from being released out from the NOx removal catalyst 14, so that the ammonia can be prevented from flowing out of the boiler 1 as it is unreacted.

In this case, the timing of outputting the changeover signal for ammonia supply earlier by the sixth set time L is controlled as follows. A move from low combustion to high combustion is effected on condition that the steam pressure of the boiler 1 falls below the first pressure. Therefore, by monitoring the variation gradient of steam pressure, and by predicting the time at which the steam pressure will reach the first pressure, a changeover signal for ammonia supply is outputted the sixth set time L earlier than the predicted time.

Now modifications of the fourth control method are described. FIG. 5 illustrates control contents including modifications of the fourth control method, and these modifications are explained. In these modification of the fourth control method, for an increase of combustion level, the third control method is used together in combination. Further, for a decrease of combustion level, the first control method and the second control method are used together in combination.

First, the modification in which the third control method is used in combination is explained. In this modification, the fourth control method is performed for a move from low combustion to high combustion, and the same control as in the third control method, i.e. the control that the ammonia supply is kept at zero for a period of the fourth set time J, is performed for a move from standby to low combustion. Therefore, detailed description of the control contents is omitted.

Next, a modification in which the first control method and the second control method in addition to the third control method are combined is explained. In this modification, a control in which the third control method and the fourth control method are combined together as in the foregoing case is performed for an increase of combustion level, whereas a control in which the first control method and the second control method are combined together is performed for a decrease of combustion level. First, at a move from high combustion to low combustion, the same control as in the first control method, i.e. the control that the ammonia supply is changed over to the third supply E, and kept as it is, for a period of the first set time F, and so detailed description of the control contents is omitted. Also, at a move from low combustion to standby, the same control as in the second control method, i.e. the control that the ammonia supply is changed over from the second supply D to zero the third set time H earlier than the changeover from the second combustion level B to zero, is performed and so detailed description of the control contents is omitted.

According to the present invention, at any changeover of combustion level, the reductant can securely be prevented from flowing outside as it is unreacted.

What is claimed is:

1. A method for controlling a NOx removal system (7) in which reductant supply is adjusted according to combustion level in a boiler (1) in which the combustion level is controlled in multiple stages, the method comprising for a decrease of the combustion level from a higher level (A) to a lower level (B), the steps of:

reducing the reductant supply from a high level (C) to a level (E) which is lower than a level (D) corresponding to a changeover-target combustion level and keeping the reductant supply at said level (E) for a period of a set time (F) from the time at which changeover of the combustion level was effected and, at the end of time period (F) measured from the time at which the reductant supply was reduced from level (C) to level (E), increasing the reductant supply to said level (D).

2. A method for controlling a NOx removal system (7) in which reductant supply is adjusted according to combustion level in a boiler (1) in which the combustion level is controlled in multiple stages, the method comprising for a decrease of the combustion level from a higher level (A) to a lower level (B), the steps of:

reducing the reductant supply from a higher level (C) to a lower level (D) and, at the end of a time period (G) measured from the time at which the reductant supply was reduced from level (C) to level (D), decreasing the combustion level from level (A) to level (B).

3. A method for controlling a NOx removal system (7) in which reductant supply is adjusted according to combustion level in a boiler (1) in which the combustion level is controlled in multiple stages, where the reductant is reacted in a NOx removal catalyst (14), the method comprising for an increase of the combustion level from a lower level (B) to a higher level (A), the steps of:

reducing the reductant supply from an intermediate level (D) to a level (E) which is lower than a level (C) corresponding to a changeover-target combustion level and keeping the reductant supply at said level (K) for a period of a set time (K) from the time at which changeover of the combustion level was effected and, at the end of time period (K) measured from the time at which the reductant supply was reduced from level (D) to level (E), increasing the reductant supply to said level (C).

4. A method for controlling a NOx removal system (7) in which reductant supply is adjusted according to combustion level in a boiler (1) in which the combustion level is controlled in multiple stages, where the reductant is reacted in a NOx removal catalyst (14), the method comprising for an increase of the combustion level from a lower level (B) to a higher level (A), the steps of:

reducing the reductant supply from an intermediate level (D) to a level (E) which is lower than a level (C) corresponding to a changeover-target combustion level and making and keeping the reductant supply at said level (E) for a period of a set time (L) lasting until the time at which changeover of the combustion level was effected and, at the end of time period (L) measured from the time at which the reductant supply was reduced from level (D) to level (E), increasing the reductant supply to said level (C).

* * * * *